United States Patent
Jeon et al.

(10) Patent No.: US 10,054,220 B2
(45) Date of Patent: Aug. 21, 2018

(54) SYSTEM AND METHOD FOR CONTROLLING SHIFT FOR VEHICLE

(71) Applicants: HYUNDAI MOTOR COMPANY, Seoul (KR); KIA MOTORS CORPORATION, Seoul (KR)

(72) Inventors: Byeong Wook Jeon, Seoul (KR); Dong Hoon Jeong, Gyeonggi-do (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 313 days.

(21) Appl. No.: 14/857,501

(22) Filed: Sep. 17, 2015

(65) Prior Publication Data

US 2016/0153548 A1 Jun. 2, 2016

(30) Foreign Application Priority Data

Nov. 28, 2014 (KR) .......................... 10-2014-0168282

(51) Int. Cl.
*B60W 10/06* (2006.01)
*B60W 10/10* (2012.01)
*F16H 61/02* (2006.01)
*F16H 61/00* (2006.01)

(52) U.S. Cl.
CPC . *F16H 61/0213* (2013.01); *F16H 2061/0015* (2013.01); *F16H 2061/0227* (2013.01)

(58) Field of Classification Search
CPC ..... F16H 2061/0015; F16H 2061/0227; F16H 61/0213; B60W 10/06; B60W 10/10; B60W 30/182
See application file for complete search history.

(56) References Cited

U.S. PATENT DOCUMENTS 4,539,643 A * 9/1985 Suzuki .................. B60W 10/06
123/198 DB
5,490,815 A * 2/1996 Kato ..................... B60W 10/06
477/181

FOREIGN PATENT DOCUMENTS

| JP | 2005-009510 A | 2/2005 |
| JP | 2005-133834 A | 5/2005 |
| WO | WO2011-101996 A1 | 8/2011 |

\* cited by examiner

*Primary Examiner* — Edwin A Young
(74) *Attorney, Agent, or Firm* — Brinks Gilson & Lione

(57) ABSTRACT

The present disclosure relates to a system and a method of controlling a shift for a vehicle that generates an upshift in an early stage under an acceleration condition and delays a downshift under a deceleration condition by estimating a fuel cut region of an engine during eco mode driving. The system for controlling a shift of a vehicle that may including: a data detector configured to detect data for shift control; and a controller configured to determine a driving mode of the vehicle by determining a fuel cut shift condition when a current driving mode of the vehicle is an eco mode based on the data, wherein the controller outputs a shift stage according to the determined driving mode.

12 Claims, 3 Drawing Sheets

SYSTEM AND METHOD FOR CONTROLLING SHIFT FOR VEHICLE

CROSS-REFERENCE TO RELATED APPLICATION

This application claims the benefit of Korean Patent Application No. 10-2014-0168282 filed on Nov. 28, 2014, the entirety of which is incorporated herein by reference.

FIELD

The present disclosure relates to a system and a method for controlling a shift for a vehicle.

BACKGROUND

The statements in this section merely provide background information related to the present disclosure and may not constitute prior art.

Customer satisfaction of driving performance of a vehicle depends in part on how precisely the vehicle runs in accordance with the driving tendency of the driver. While tendencies of the customers vary, the performance characteristic of the vehicle is set to one performance characteristic in the same vehicle model. Therefore, reaction of the vehicle may not coincide with the tendency of the customer. Accordingly, the customer often lodges a complaint against the driving performance of the vehicle. That is, if the driving tendency of the customer is understood and a shift of the vehicle is controlled to coincide with the tendency of the customer, the customer satisfaction related to the driving performance may be improved. Therefore, many methods of learning the driving tendency of the customer and controlling the shift according to the learned driving tendency have been developed.

In recent years, various driving pattern modes such as an eco (economy) mode and a sport mode have been developed and applied to the automatic transmission vehicle in order to improve customer satisfaction. The eco mode can improve fuel efficiency, and the sport mode can improve driving performance.

A shift pattern of the eco mode can be determined to generate an upshift in a low rotation speed region of an engine. However, we have discovered that in view of the shift pattern of the eco mode, a downshift line should be lower than an upshift line on the basis of a vehicle speed, so the downshift line is declined when the upshift line is declined. Thus, a shifting point before stopping may be determined as a low vehicle speed such that an amount of engine braking may be decreased.

Accordingly, fuel efficiency may be deteriorated since a fuel cut function due to the engine brake cannot be effectively used.

SUMMARY

The present disclosure provides a system and a method for controlling a shift of a vehicle capable of generating an upshift in an early stage under an acceleration condition and increasing a vehicle speed which generates a downshift under a deceleration condition by estimating a fuel cut region of an engine during eco mode driving.

One form of the present disclosure provides a system of controlling a shift for a vehicle that may include: a data detector configured to detect data for shift control; and a controller configured to determine a driving mode of the vehicle by determining a fuel cut shift condition when a current driving mode of the vehicle is an eco mode based on the data, wherein the controller outputs a shift stage according to the determined driving mode.

The controller may determine that the fuel cut shift condition is satisfied when a position value of an accelerator pedal is less than a predetermined value, a lift-foot-up condition is satisfied, and a predicted rotation speed of a target shift stage is less than a fuel cut engine speed.

The controller may change the driving mode of the vehicle from the eco mode to a normal mode when the fuel cut shift condition is satisfied.

The controller may maintain the driving mode of the vehicle as the eco mode when the fuel cut shift condition is not satisfied.

The controller may output the shift stage when it is possible to cut fuel according to the normal mode.

The controller may calculate the predicted rotation speed of the target shift stage by multiplying a gear ratio of the target shift stage and a rotation speed of a transmission output shaft.

The data detector may include: an accelerator pedal position sensor configured to detect a position value of an accelerator pedal; a vehicle speed sensor configured to detect a speed of the vehicle; a shift stage sensor configured to detect a shift stage of the vehicle; and an acceleration sensor configured to detect acceleration of the vehicle.

Another form of the present disclosure provides a method of controlling a shift for a vehicle that may include: detecting data for shift control; determining whether a current driving mode of the vehicle is an eco mode based on the data; determining whether a fuel cut shift condition is satisfied when the current driving mode of the vehicle is the eco mode; changing a driving mode of the vehicle from the eco mode to a normal mode when the fuel cut shift condition is satisfied; determining a shift stage at which it is possible to cut fuel according to the normal mode; and outputting the determined shift stage and controlling the shift.

The fuel cut shift condition may be satisfied when a position value of an accelerator pedal is less than a predetermined value, a lift-foot-up condition is satisfied, and a predicted rotation speed of a target shift stage is less than a fuel cut engine speed.

The predicted rotation speed of the target shift stage may be calculated by multiplying a gear ratio of the target shift stage and a rotation speed of a transmission output shaft.

If the fuel cut shift condition is not satisfied, the method may further include: maintaining the driving mode of the vehicle as the eco mode; and determining the shift stage according to the eco mode.

The data may include information on at least one of a position value of an accelerator pedal, a speed of the vehicle, an acceleration of the vehicle, and a shift stage of the vehicle.

The shift control may include a change of a shift pattern, a change of engaging feeling to a target shift stage, a change of an engine torque map, and a change of an engine torque filter.

As described above, according to one of the present disclosure, shifting of the vehicle can be controlled to generate an upshift in an early stage under an acceleration condition and to increase a vehicle speed which generates a downshift under a deceleration condition by estimating a fuel cut region of an engine, such that fuel efficiency can be improved.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
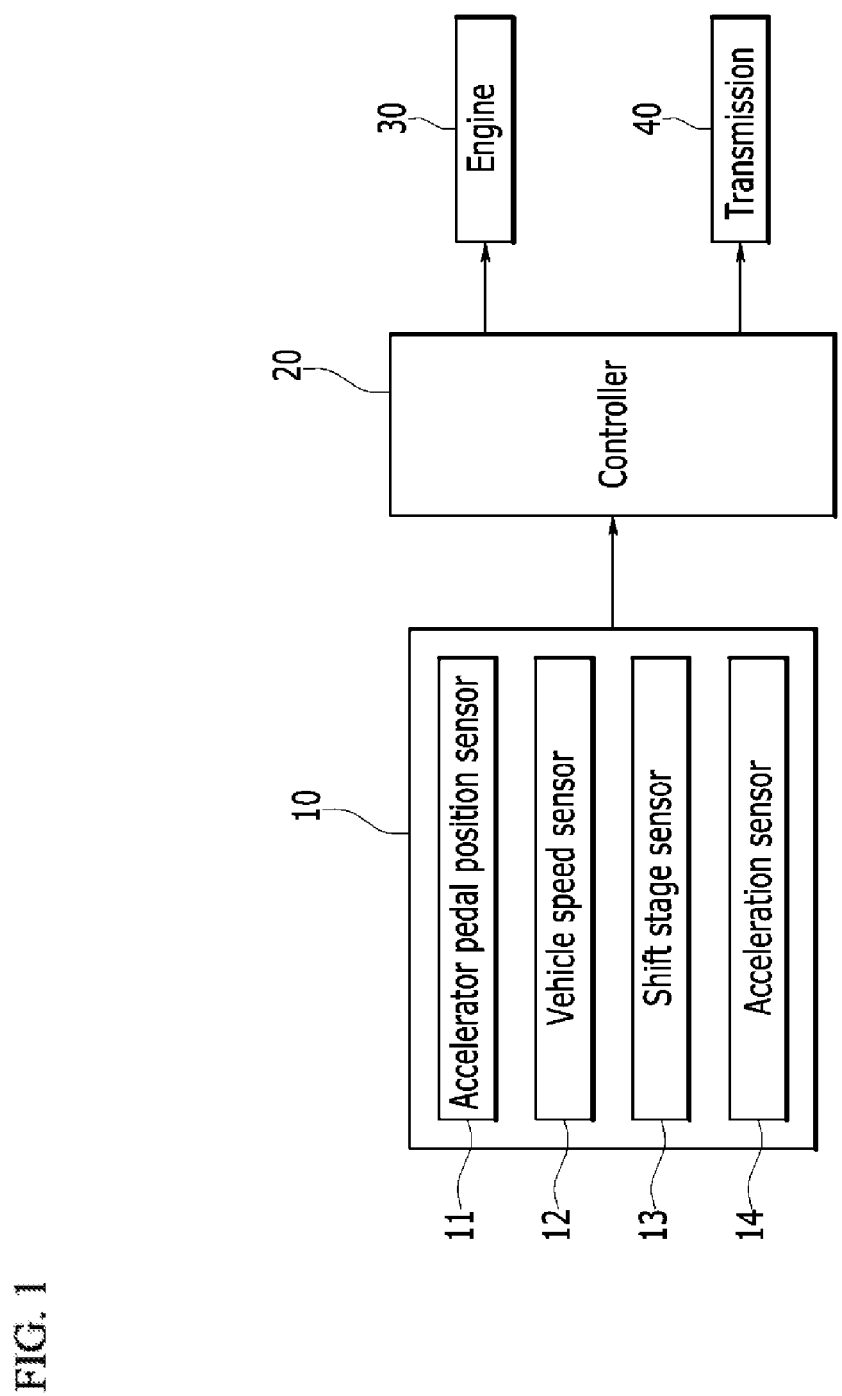
FIG. 1 is a block diagram of a system for controlling a shift for a vehicle according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It is understood that the term "vehicle" or "vehicular" or other similar terms as used herein is inclusive of motor vehicles in general, including hybrid vehicles, plug-in hybrid electric vehicles, and other alternative fuel vehicles (e.g., fuels derived from resources other than petroleum). As referred to herein, a hybrid electric vehicle is a vehicle that has two or more sources of power, for example a vehicle that is both gasoline powered and electricity powered.

Additionally, it is understood that some of the methods may be executed by at least one controller. The term controller refers to a hardware device that includes a memory and a processor configured to execute one or more steps that should be interpreted as its algorithmic structure. The memory is configured to store algorithmic steps, and the processor is specifically configured to execute said algorithmic steps to perform one or more processes which are described further below.

Furthermore, the control logic of the present disclosure may be embodied as non-transitory computer readable media on a computer readable medium containing executable program instructions executed by a processor, a controller, or the like. Examples of computer readable media include, but are not limited to, ROM, RAM, compact disc (CD)-ROM, magnetic tapes, floppy disks, flash drives, smart cards, and optical data storage devices. The computer readable recording medium can also be distributed in network coupled computer systems so that the computer readable media is stored and executed in a distributed fashion, e.g., by a telematics server or a controller area network (CAN).

As shown in FIG. 1, a system of controlling a shift for a vehicle according to one form of the present disclosure includes a data detector 10, a controller 20, an engine 30, and a transmission 40.

The data detector 10 detects data for shift control, and data detected by the data detector 10 is transmitted to the controller 20. The data detector 10 includes an accelerator pedal position sensor 11, a vehicle speed sensor 12, a shift stage sensor 13, and an acceleration sensor 14.

The accelerator pedal position sensor 11 detects a degree with which a driver pushes an accelerator pedal. That is, the accelerator pedal position sensor 11 detects the data related to a driver's desired acceleration. The position value of the accelerator pedal may be 100% when the accelerator pedal is pressed fully, and the position value of the accelerator pedal may be 0% when the accelerator pedal is not pressed at all.

A throttle valve position sensor (TPS) that is mounted on an intake pipe may be used instead of the accelerator pedal position sensor 11. Therefore the accelerator pedal position sensor 11 includes the throttle valve position sensor, and the position value of the accelerator pedal should be understood to be an opening value of the throttle valve.

The vehicle speed sensor 12 detects a vehicle speed, and is typically mounted at a wheel of the vehicle. Alternatively, the vehicle speed may be calculated based on a Global Positioning System (GPS) signal received by a GPS unit.

Meanwhile, a target shift-speed may be calculated by using a shift pattern based on the signal of the accelerator pedal position sensor 11 and the signal of the vehicle speed sensor 12, and the shift to the target shift-speed is controlled. That is, hydraulic pressure supplied to a plurality of friction elements or released from the plurality of friction elements is controlled in an automatic transmission provided with a plurality of planetary gear sets and the plurality of friction elements. In addition, a current applied to a plurality of synchronizer devices and actuators is controlled in a double clutch transmission.

The shift stage sensor 13 detects a shift-speed that is currently engaged.

The acceleration sensor 14 detects acceleration of the vehicle. The acceleration sensor 14 may be mounted in addition to the vehicle speed sensor 12, and may directly detect the acceleration of the vehicle, or the acceleration sensor 14 may calculate the acceleration of the vehicle by differentiating the vehicle speed detected by the vehicle speed sensor 12.

The controller 20 determines a current driving mode of the vehicle based on the data detected by the data detector 10, by determining a fuel cut shift condition when the current driving mode of the vehicle is an eco mode.

The controller 20 determines that the fuel cut shift condition is satisfied when a position value of an accelerator pedal is less than a predetermined value, a lift-foot-up condition is satisfied, and a predicted rotation speed of a target shift stage is less than a fuel cut engine speed.

The controller 20 changes the driving mode of the vehicle from the eco mode to a normal mode when the fuel cut shift condition is satisfied. Alternatively, the controller 20 maintains the driving mode of the vehicle as the eco mode when the fuel cut shift condition is not satisfied.

After that, the controller 20 outputs the shift stage in which fuel cut is possible according to the determined driving mode of the vehicle and controls the shift. For these purposes, the controller 20 may be implemented with at least one processor operating by a predetermined program, and the predetermined program may be programmed to perform each step of a method of controlling a shift for a vehicle according to one form of the present disclosure.

Hereinafter, a method of controlling a shift for a vehicle according to another form of the present disclosure will be described in detail with reference to the accompanying drawings.

Figure 2:
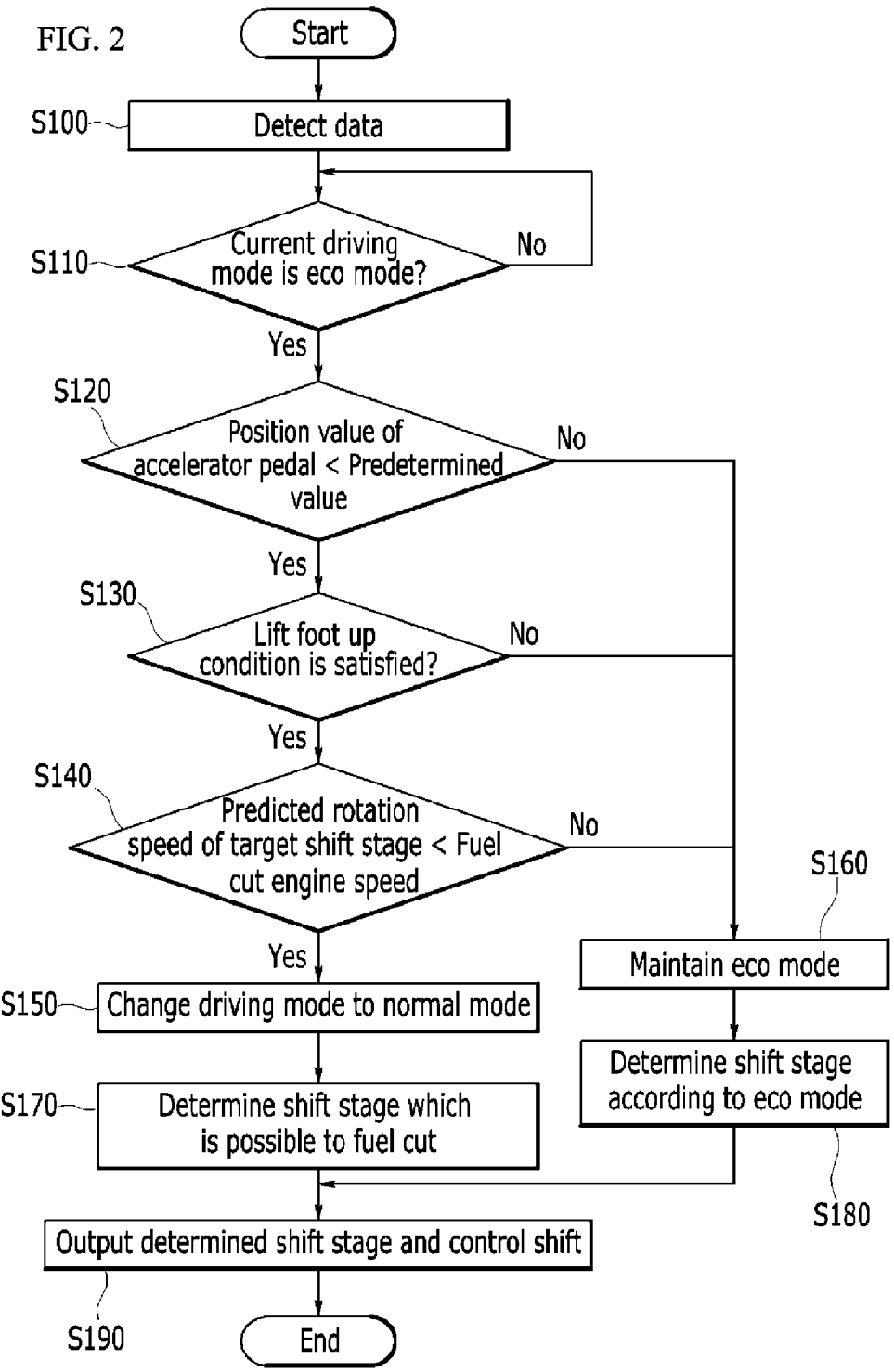
FIG. 2 is a flowchart of a method of controlling a shift for a vehicle according to one form of the present disclosure.

FIG. 2 is a flowchart of a method of a controlling a shift for a vehicle according to one form of the present disclosure.

The method of controlling a shift for a vehicle according to one form of the present disclosure begins with detecting the data for shift control at step S100.

The data detector 10 detects the data for the shift control at the step S100, and the controller 20 determines whether a current driving mode of the vehicle is an eco mode at step S110. More specifically, the controller 20 determines whether a fuel efficiency shift pattern generating an upshift in an early stage is applied to the current driving mode of the vehicle.

When the current driving mode of the vehicle is the eco mode at the step S110, the controller 20 compares a position value of an accelerator pedal with a predetermined value at step S120. If the position value of the accelerator pedal is less than the predetermined value, the controller 20 may determine that the vehicle is under a deceleration condition.

When the position value of the accelerator pedal is less than the predetermined value at the step S120, the controller 20 determines whether a lift-foot-up condition is satisfied at step S130. The lift-foot-up condition means that a driver takes his foot from the accelerator pedal, such that an opening of a throttle valve becomes closed. That is, opening of the throttle valve becomes 0% because the accelerator pedal is not pushed, and accordingly the vehicle may generate an upshift.

When the lift-foot-up condition is satisfied at the step S130, the controller 20 compares a predicted rotation speed of a target shift stage and a fuel cut engine speed at step S140. That is, the controller 20 determines that the fuel cut is maintained or released by predicting a decrease of an engine speed according to the target shift stage. The predicted rotation speed of the target shift stage is calculated by multiplying a gear ratio of the target shift stage and a rotation speed of a transmission output shaft.

When the predicted rotation speed of the target shift stage is less than the fuel cut engine speed at the step S140, the controller 20 changes a driving mode of the vehicle form the eco mode to a normal mode at step S150. That is, the controller 20 determines that the fuel cut shift condition is satisfied when the position value of the accelerator pedal is less than the predetermined value, the lift-foot-up condition is satisfied, and the predicted rotation speed of the target shift stage is smaller than the fuel cut engine speed.

When the driving mode of the vehicle is changed to the normal mode at the step S150, the controller 20 determines a shift stage in which fuel cut is possible according to the normal mode at step S170.

Alternatively, if the position value of the accelerator pedal is greater than or equal to the predetermined value, the lift-foot-up condition is not satisfied, and the predicted rotation speed of the target shift stage is greater than or equal to the fuel cut engine speed, the controller 20 determines that the fuel cut shift condition is not satisfied and maintains the driving mode of the vehicle as the eco mode at step S160.

After that, the controller 20 determines a shift stage according to the eco mode at step S180.

When the shift stage is determined at the step S170 or the step S180, the controller 20 outputs the determined shift stage and controls the shift at step S190.

Figure 3:
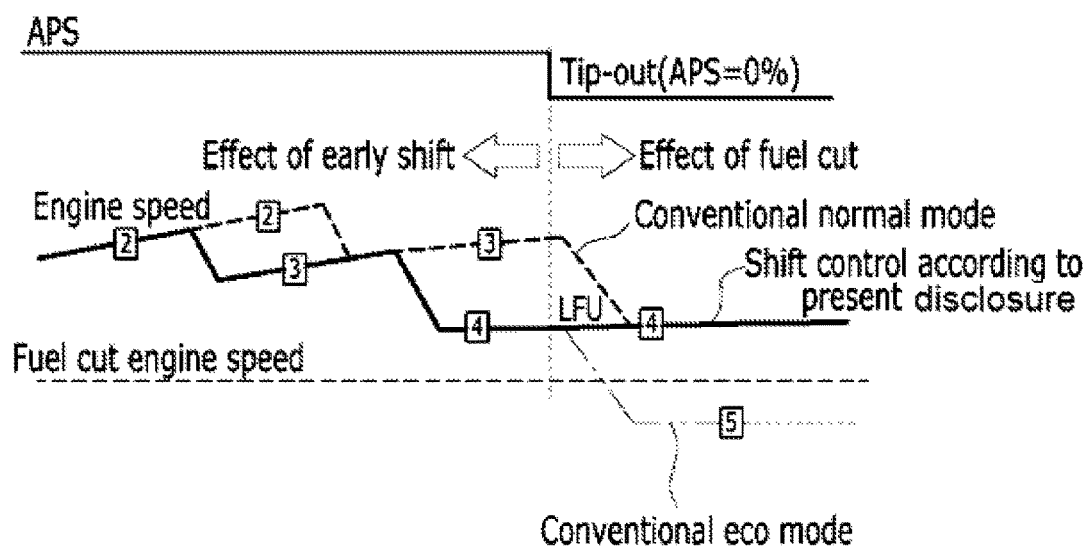
FIG. 3 is a diagram illustrating a comparison of a shift stage according to a conventional art and a shift stage of a vehicle to which a method of controlling shift for a vehicle according to an exemplary form of the present disclosure is applied.

FIG. 3 is a diagram illustrating a comparison of a shift stage according to a conventional art and a shift stage of a vehicle to which a method of controlling a shift for a vehicle according to one form of the present disclosure is applied.

As shown in FIG. 3, when the vehicle is accelerating because the position value of the accelerator pedal is greater than the predetermined value, an early shifting effect can be obtained according to the eco mode rather than the normal mode.

After that, when the position value of the accelerator pedal is 0% and the fuel cut shift condition is satisfied, shift control may be restricted as a shift stage in which fuel cut is possible. Therefore, a fuel cut effect may be maintained contrary to a conventional eco mode that shifts to less than a fuel cut engine speed.

As described above, according to one form of the present disclosure, shifting of the vehicle that generates an upshift in an early stage under an acceleration condition and increases a vehicle speed which generates a downshift under a deceleration condition by estimating a fuel cut region of an engine can be controlled, and thereby fuel efficiency can be improved.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system for controlling a shift of a vehicle, comprising:
   a data detector configured to detect data for shift control; and
   a controller configured to determine a driving mode of the vehicle, the driving mode being selected from a normal mode and an eco mode, the eco mode having an upshift line and a downshift line which are lower than an upshift line and a downshift line of the normal mode, the controller being configured to determining the driving mode by determining a fuel cut shift condition when a current driving mode of the vehicle is an eco mode based on the data,
   wherein the controller controls a transmission and an engine to shift to a target shift stage according to the determined driving mode.

2. The system of claim 1, wherein the controller determines that the fuel cut shift condition is satisfied when a position value of an accelerator pedal is less than a predetermined value, a lift-foot-up condition is satisfied, and a predicted engine speed at the target shift stage according to the normal mode is smaller than a fuel cut engine speed.

3. The system of claim 2, wherein the controller changes the driving mode of the vehicle from the eco mode to the normal mode when the fuel cut shift condition is satisfied.

4. The system of claim 3, wherein the controller controls the transmission and the engine to shift to the target shift stage according to the normal mode.

5. The system of claim 2, wherein the controller maintains the driving mode of the vehicle as the eco mode when the fuel cut shift condition is not satisfied.

6. The system of claim 2, wherein the controller calculates the predicted engine speed at the target shift stage according to the normal mode by multiplying a gear ratio of the target shift stage and a rotation speed of a transmission output shaft.

7. The system of claim 1, wherein the data detector comprises:
   an accelerator pedal position sensor configured to detect a position value of an accelerator pedal;
   a vehicle speed sensor configured to detect a speed of the vehicle;
   a shift stage sensor configured to detect a current shift stage of the vehicle; and an acceleration sensor configured to detect acceleration of the vehicle.

8. A method of controlling a shift for a vehicle, comprising:
  detecting, by a data collector, data for shift control;
  determining, by a controller, whether a current driving mode of the vehicle is an eco mode based on the data, the driving mode being selected from a normal mode and an eco mode, the controller being configured to determining the driving mode, the eco mode having an upshift line and a downshift line which are lower than an upshift line and a downshift line of the normal mode;
  determining, by the controller whether a fuel cut shift condition is satisfied when the current driving mode of the vehicle is the eco mode;
  changing, by the controller, the driving mode of the vehicle from the eco mode to the normal mode when the fuel cut shift condition is satisfied;
  determining, by the controller, a target shift stage according to the normal mode; and
  controlling, by the controller, a transmission and an engine to shift to the determined target shift stage and according to the normal mode.

9. The method of claim 8, wherein the fuel cut shift condition is satisfied when a position value of an accelerator pedal is less than a predetermined value, a lift-foot-up condition is satisfied, and a predicted engine speed at the target shift stage according to the normal mode is less than a fuel cut engine speed.

10. The method of claim 9, wherein the predicted engine speed at the target shift stage according to the normal mode is calculated by multiplying a gear ratio of the target shift stage and a rotation speed of a transmission output shaft.

11. The method of claim 9, further comprising:
  maintaining, by the controller, the driving mode of the vehicle as the eco mode if the fuel cut shift condition is not satisfied; and
  determining, by the controller, the target shift stage according to the eco mode.

12. The method of claim 8, wherein the data comprises information on at least one of a position value of an accelerator pedal, a speed of the vehicle, acceleration of the vehicle, and a current shift stage of the vehicle.

* * * * *